(No Model.)
R. N. APPLEGATE.
Safety Stirrup Bar for Saddles.
No. 241,274. Patented May 10, 1881.
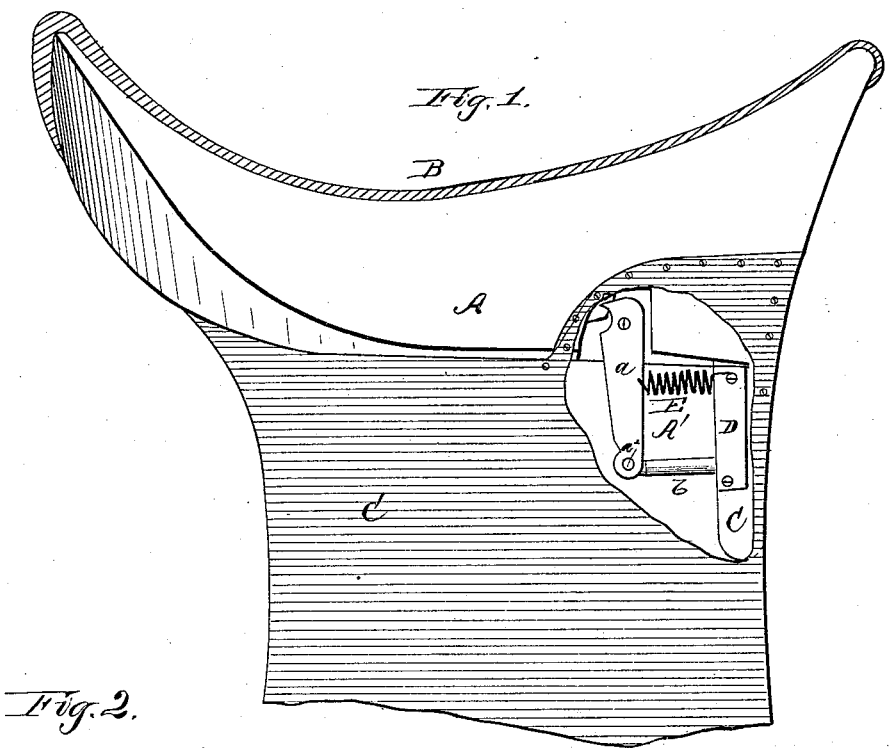
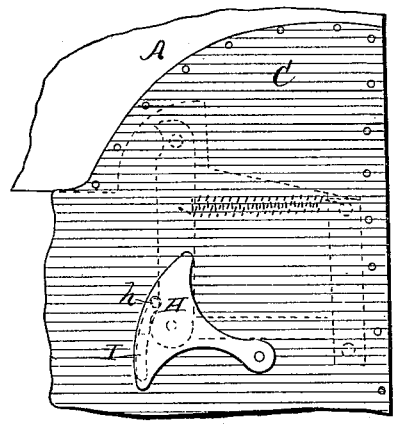
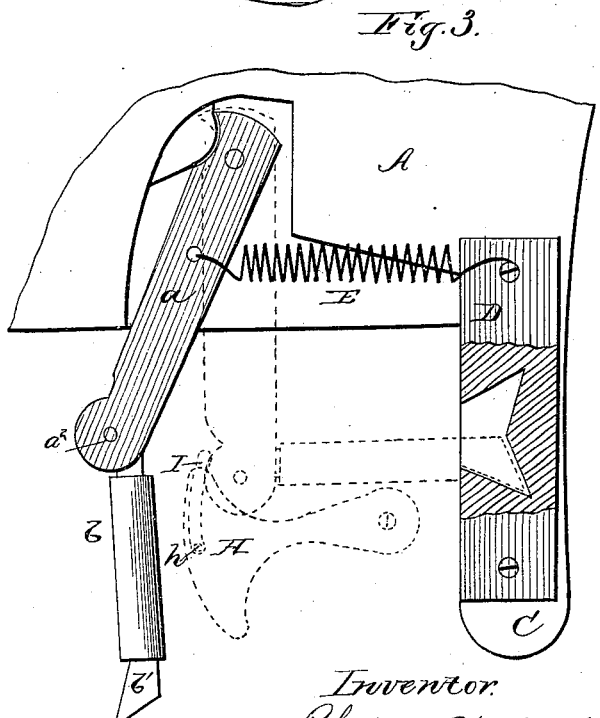

UNITED STATES PATENT OFFICE.

ROBERT N. APPLEGATE, OF SARDIS, KENTUCKY.

SAFETY STIRRUP-BAR FOR SADDLES.

SPECIFICATION forming part of Letters Patent No. 241,274, dated May 10, 1881.

Application filed February 10, 1881. (No model.)

*To all whom it may concern:*

Be it known that I, ROBERT N. APPLEGATE, of Sardis, in the county of Mason and State of Kentucky, have invented certain new and useful Improvements in Safety Stirrup-Bars for Saddles; and I do hereby declare that the following is a full, clear, and exact description thereof, reference being had to the accompanying drawings, and to the letters of reference marked thereon, which form part of this specification, in which—

Figure 1 is a side view, partly in section, of my saddle. Fig. 2 is a side view of lock, and Fig. 3 a view of the stirrup-bar detached.

My invention relates to that class of loops or buckles which are employed for the purpose of connecting the stirrup-straps with a riding-saddle.

The object of my improvement is to provide devices for connecting the stirrup-straps with the saddle, which, in the event of the rider being thrown from the horse and his foot becoming caught in the stirrup, will, by reason of the lateral tension of the straps upon said devices, automatically release the straps, and thus prevent the rider from being dragged along the ground.

The improvement consists, first, in a device for connecting a stirrup-strap with a riding-saddle, consisting of a jointed spring-arm pivoted to the saddle-tree, and adapted to form a suspension-loop by the engagement of its free end with a socket, the section of the arm which is pivoted to the saddle-tree being adapted to be swung back so as to disengage the free end of the arm from the socket, and thereby release the stirrup-straps; second, in the combination with a saddle-tree, of a jointed arm pivoted at one end to the saddle-tree, and formed with a beveled catch at its remaining free end, a socket secured to the saddle-tree to receive the catch, and a spring arranged to hold the catch normally in the socket, all as hereinafter more fully described.

In the drawings, A indicates the tree of a riding-saddle, which is provided with the usual covering, B, and side flaps, C C, through each of which said flaps is formed an opening for the stirrup-strap.

My device for connecting the stirrup-strap with the saddle-tree is concealed by the flap and covering, as is usual with devices for such purpose, and it is constructed as follows:

One of the sections, $a$, of a jointed arm, A', is pivoted to the saddle-tree, the remaining section, $b$, of said jointed arm being formed with a beveled catch, $b'$. A socket to receive this catch is formed upon a downwardly-extending part, C, at the front of the saddle. This socket D may be formed in any suitable manner, and may be made of a single casting, or of several parts, as desired. A spring, E, connects the section $a$ of the jointed arm with the socket-piece, or with the front part of the saddle-tree to which the socket-piece is secured. The arm A' has but one joint, $a^2$, and when the free end or section $b$ of said arm is brought into a horizontal position the beveled catch thereon will engage the socket, thereby affording a support for the stirrup-strap, which is passed over the section $b$ of the jointed arm, and thence out through the opening in the flap of the saddle. In case, however, the rider is thrown from the horse and his foot caught in the stirrup, the stirrup-strap will obviously be drawn against the section $a$ of the jointed arm, thereby drawing back the same and disengaging the free or catch end of the jointed arm from the socket, and allowing it to immediately drop to a vertical position. This frees the strap from the connecting device or loop, and hence will avoid any dragging of the rider over the ground. So long as the strain upon the loop is in a vertical or nearly vertical line the catch will remain safely within the socket; but when the line of strain is shifted to an approximately horizontal line upon the loop, then the loop will readily open, and thus automatically free the stirrup-strap.

The section $a$ might be made of spring metal, although I prefer the spring herein shown. In cases where the saddle-tree is rounded at the front, so as to dispense with the extension C, I employ a suitable frame, which can be secured to the saddle-tree by clips, or in any other suitable way, the bar of said frame subserving the functions of the extension C.

To prevent the loop from opening while the rider is mounting the horse, I employ a lock composed of a pivoted plate, H, having a pin, $h$, which passes through a slot, I, formed through the saddle-flap, said slot being shown in dotted lines, Fig. 2. By raising the plate the pin is brought back of the lower end of that section of the jointed arm of the loop which is pivoted to the saddle-tree, as shown in said figure, and also in dotted lines, Fig. 3.

My device is simple and effective, and its use will obviate a large number of accidents which otherwise frequently happen to horsemen using saddles in which the stirrup-straps are connected with the saddle-tree by rings or buckles.

Having thus described my invention, what I claim, and desire to secure by Letters Patent, is—

1. A device for connecting a stirrup-strap with a riding-saddle, consisting of a jointed spring-arm pivoted to the saddle-tree, and adapted to form a suspension-loop by the engagement of its free end with a socket, the section of the jointed arm which is pivoted to the saddle-tree being adapted to be swung back so as to disengage the free end of the arm from the socket, and thereby release the stirrup-strap, substantially as described.

2. The combination, with a saddle-tree, of a jointed arm pivoted at one end to the saddle-tree, and formed with a beveled catch at its remaining free end, a socket upon the saddle-tree to receive the catch, and a spring arranged to hold the catch normally in the said socket, substantially as and for the purpose described.

3. The combination, with a stirrup-loop consisting of a jointed arm pivoted to the saddle-tree and having its free end adapted to engage with a socket, of a lock consisting of a pivoted plate having a pin passing through a slot in the saddle-flap, and arranged to be moved against the pivoted section of the jointed arm, to hold the same from swinging and maintain the free end of said arm within the socket, substantially as described.

In testimony that I claim the foregoing as my own I affix my signature in presence of two witnesses.

ROBT. N. APPLEGATE.

Witnesses:
T. H. ALEXANDER,
AUG. A. NICHOLSON.